E. G. BURESCH.
ELECTRIC SWITCH.
APPLICATION FILED SEPT. 7, 1920.
1,433,120.
Patented Oct. 24, 1922.
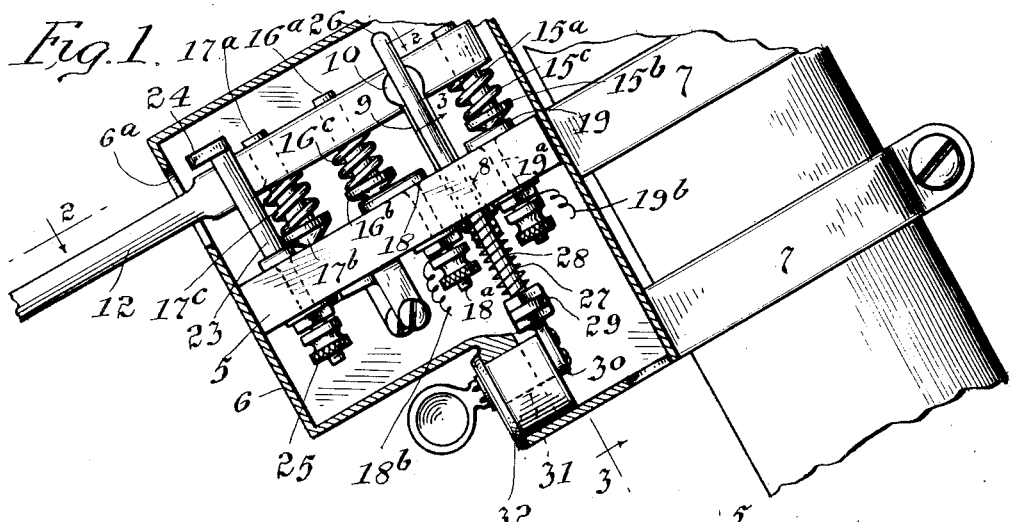
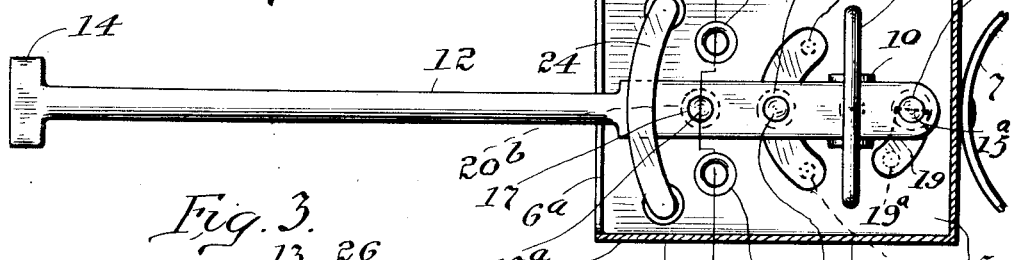
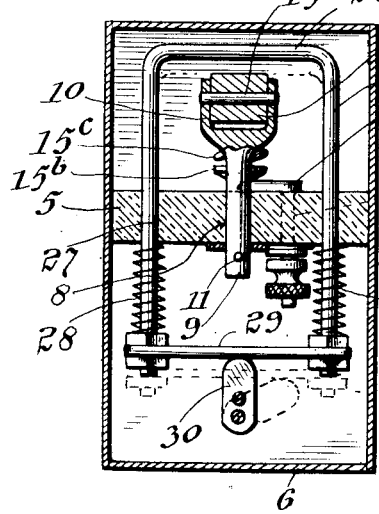
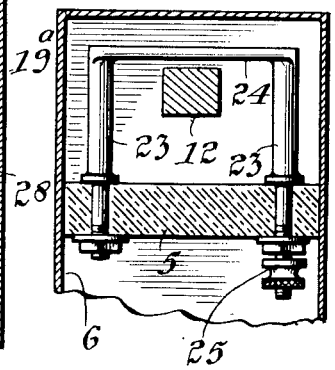
Inventor:
Edward G. Buresch
By Benjamin Roodhouse & Lundy
Attys.

Patented Oct. 24, 1922.

1,433,120

UNITED STATES PATENT OFFICE.

EDWARD G. BURESCH, OF CHICAGO, ILLINOIS.

ELECTRIC SWITCH.

Application filed September 7, 1920. Serial No. 408,431.

*To all whom it may concern:*

Be it known that I, EDWARD G. BURESCH, a citizen of the United States, and a resident of Chicago, in the county of Cook and State of Illinois, have invented certain new and useful Improvements in an Electric Switch, of which the following is a full, clear, and exact description, such as will enable others skilled in the art to make and use the same.

My invention relates to electric switches and more particularly to the type of switches employed in connection with the electrical systems of motor vehicles for controlling the divers circuits now usually employed in such vehicles; such, for example, as the ignition circuit, the horn circuit, both the bright and dim headlight circuits and the rear or taillight circuits.

I have so designed my switch that it may be readily installed upon the steering post near the wheel of a motor vehicle whereby the entire system is under control through the instrumentality of a single operating lever which is within convenient reach of the operator's hand at all times without releasing control of the wheel. Electrical instruments now in use on motor vehicles are controlled through individual or separate switch devices for, respectively, the lights, the horn and the other structures, and these switches are usually in the form of operating buttons or knobs located in separated positions upon the steering post and also upon the cowl or instrument-board of the vehicle. When mounted on the instrument-board it is necessary for the operator to lean forward from the seat to reach and operate these buttons, and individual buttons wherever located are objectionable because the operator must select from among several the proper button to perform the function desired, and both of such installations are undesirable and often very inconvenient especially at a time when it is necessary for the operator to devote his attention to the control of the vehicle. I successfully overcome these inherent objections in these prior structures by providing a switch device that is so compact that it may be readily installed upon the steering-post or column of a motor vehicle, and the operation thereof controlled entirely through the instrumentality of a single lever that is adapted to be moved by the operator to predetermined positions to control the respective circuits usually employed on an automobile.

Other objects of my invention are the provision of an electric switch that is easy to operate and install; that has few parts to assemble when being manufactured, and can be readily taken apart for replacement or repairs; that is dependable in operation; and is comparatively inexpensive to manufacture so that it may be sold to the user for a relatively moderate price.

I prefer to accomplish the divers objects of my invention in substantially the manner hereinafter fully described, and as more particularly pointed out in the claims, reference being now had to the accompanying drawings that form a part of this specification.

In the drawings:

Figure 1 is a vertical side elevation of my switch, the casing or housing being in section, and the device shown attached to a steering post for a motor vehicle.

Figure 2 is a top plan of the switch structure.

Figure 3 is a vertical transverse section taken on line 3—3, Figure 2.

Figure 4 is a view similar to Figure 3, and taken on line 4—4, Figure 2.

Figure 5 is a view similar to Figure 3, taken on line 5—5, Figure 2.

In the drawings, similar reference characters have been employed to designate the same parts throughout the several views, and by referring to said drawings, it will be seen my device preferably comprises a block or plate 5 of fiber, porcelain or other suitable insulating material that is mounted within a suitably shaped housing or box-like casing 6, the latter being provided with means, such as a flexible metal strap or yoke 7, that surrounds and may be clamped to the steering-post or column of a motor vehicle a short distance below the hub of the steering wheel.

An opening 8 is made transversely through this block 5 to receive the shank 9 of a fulcrum-post, the upper portion thereof is shaped into a bifurcated head 10, and the lower end thereof, which passes out of opening 8 a slight distance, receives a transverse cotter-pin 11 to retain the fulcrum-post in said opening, but permit of its rotation therein. The operating lever or bar 12, which is slightly increased in size at its inner end, is fulcrumed upon a pivot pin 13 passing transversely through this enlarged portion of lever 12 and through the bifurcations of head 10. One end of the operating bar passes through an elongated opening 6ª in one of the walls of the casing and is long enough to extend to the adjacent segment of the steering wheel where it is formed with a widened or T-shaped handle portion 14 for convenience in grasping it to operate the same. This construction permits the lever to be oscillated substantially at a right angle to the plane of the block 5 as well as rotated in an arc with the fulcrum-post as a center in a plane parallel with the face of the block, or in other words said lever has a universal range of movement within a limited radius, so that at all times and in any position during its segmental or arcuate movement the pivotal movement of the lever upon pin 13 may take place to perform the functions to be hereinafter described.

A plurality, preferably three, openings 15, 16 and 17 are made through the enlarged portion of lever 12, the first opening 15 being transversely through the shorter end of the lever beyond its fulcrum and the two latter openings, 16 and 17, being transversely through the adjacent portion of said lever upon the opposite side of the fulcrum. Short stubs 15ª, 16ª and 17ª are fitted loosely in these respective openings and have enlarged heads or mushroom shaped lower ends 15ᵇ, 16ᵇ, and 17ᵇ that contact upon their lower segments with the block of insulating material or the other structures provided therefor, and said studs are kept normally pressed into contact by coiled expansion springs 15ᶜ, 16ᶜ and 17ᶜ surrounding the studs between their respective heads and the under surface of lever 12. A segmental shaped contact plate 18 is secured in position below and contacting the head 16ᵇ of stud 16, and the shank of a binding-post 18ª extends through the insulation block 5 and suitably connects with this segmental plate 18, while the opposite or lower end of this binding-post is connected to a conductor or wire 18ᵇ leading to the usual battery or battery circuit (not shown) whereby the current is passed to stud 16ª to be distributed through lever 12 to the parts hereinafter referred to. It will be understood the segmental plate 18 is long enough to permit its respective studs and shoe to be constantly in contact therewith throughout the arcuate movement of the lever, and it will be observed, a wiping contact is made between the parts at all times during operation. It will also be noted that during a transverse movement of the lever upon pin 13 the shoe or head 16ᵇ will remain in contact with plate 18, because of the sliding engagement of shank or stud 16ª in its opening and the action of the spring surrounding the same.

Secured to insulating plate or block 5 upon the opposite side of the fulcrum post is a shorter segmental shaped contact plate 19 that is connected by a binding post 19ª, which passes through block 5, with a conductor 19ᵇ leading to the rear or tail-light of the vehicle, but plate 19 is of such dimensions and is so positioned that head 15ᵇ of stud 15ª will not contact therewith until the lever is moved to the position shown in Figure 2, and prior to this position all lights are extinguished, but upon the movement of the lever or handle to turn on the head-lights (to be later described) head 15ᵇ will ride upon its plate, thus making the circuit through the rear lamp.

The structure for controlling the headlights comprises three hollow stub pieces or tubes 20ª, 20ᵇ and 20ᶜ that extend through insulating plate 5 from the upper to the under surface thereof and the axes thereof are positioned in an arc struck from the center of the fulcrum-post and in the path described by the head or shoe 17ᵇ. The first tube 20ª is "dead",— that is, it has no electrical connection with any portion of the switch or the circuits, and is located upon the block 5 in such position that when its respective head or shoe 17ᵇ is seated in its upper end shoe 15ᵇ upon the short end of the lever will be out of circuit or off its contact plate 19. This is the normal position of the lever and parts when the vehicle is driven in day time or when no lights are required. By moving the handle end of the lever, forward shoe 17ᵇ will ride out of the end of tube 20ª across the surface of the block and slide or snap into the end of the next tube 20ᵇ, which is connected through a binding post 21 on its opposite or lower end with the circuit in which the dim head-light lamps are interposed. When the lever shall have reached the position just described, head 15ᵇ will have engaged its contact plate and lighted the rear or tail lamp. A further forward movement of the lever disengages shoe 17ᵇ from tube 20ᵇ, and it will again be moved across the surface of block 5 momentarily extinguishing the dim head-light lamps and will snap into the end or last tube 20ᶜ, which is connected through a binding post 22 on its opposite lower end with the circuit in which the bright head-light lamps are interposed, thus changing the headlights from the dim to the bright lamps. During this change of lamps in the headlights shoe 15ª remains in contact, but is moved along the contact plate 16 so that the rear or tail-light is not extinguished.

Spaced from block 5 by suitable supports 23 is a contact plate 24 that bridges the adjacent portion of the lever, but is normally spaced or separated from and out of contact therewith. This plate is connected into the circuit with the horn or other alarm device through binding post 25, and upon the raising of the lever in any of its before mentioned positions the adjacent surfaces of the lever and plate 24 will be brought into contact causing the current to pass therethrough and sound the horn. Owing to the yielding engagement of the shoes with their respective contacts the fulcruming of the lever on the pivotal pin 13 for the purpose of sounding the horn will permit the divers elements to remain in their respective positions notwithstanding the change in position of the lever. It, of course, will be understood that the contact plates and tubes may be made yielding and the studs and shoes rigid to accomplish the same functioning of the elements above described.

For the purpose of carrying the ignition circuit through the switch, I have provided a short bridge-bar 26 that extends transversely across lever 12 above its fulcrum upon the pin 13, and centrally above fulcrum-post 9. This bar 26 is mounted upon the upper end of a substantially U-shaped carrier, the parallel arms 27 thereof pass loosely through block 5 and are surrounded by coil expansion springs 28 between the under surface of the block and the transverse connecting member 29 of the carrier. The springs exert their force to pull the arms downward through block 6 and bring the bridge-bar into contact with the adjacent surface of the operating lever. Below member 29 of the carrier is a cam in the form of an eccentrically journaled disk 30 the rotative movement thereof is adapted to bring the edge of the disk into contact with the bottom face of member 29 to reciprocate the carrier transversely through the block and thereby raise or lower the bridge-bar out of or into contact with the adjacent portion of lever 12. The cam may be actuated in any suitable manner, preferably by mounting the disk eccentrically upon the end of barrel 31 of a permutation or tumbler lock 32 to be rotated by a key in the manner of the commercial "Yale" or "Corbin" locks, and I have not shown the details of this mechanism because it is quite well known. Owing to the disposition of bridge-bar 26 across the axis of movement of the lever both upon the fulcrum-post 9 and pivot pin 13, the contact between bar 26 and the lever is constant during the time the ignition circuit is in use, but upon the locking of the device the cam is rotated which elevates the bridge-bar out of contact with the lever and breaks the ignition circuit.

While I have herein disclosed certain specific instrumentalities for carrying out my invention, it will, of course, be obvious to others skilled in the art that divers changes may be made without departing from the principles involved. I, therefore, desire it understood that all such changes are fully contemplated within the scope of my invention as expressed in the appended claims.

What I claim as new is:

1. An electric switch comprising a support, a plurality of electrical contact elements carried by said support, a portion of which elements being substantially in the plane of said support and the remainder of said elements being bridged above said support, an operating lever movable in a segmental path above said support and having members projecting therefrom adapted to engage certain of said contacts, and means whereby said lever may be moved transversely to its segmental path to engage said bridged elements while the members projecting from said lever remain in their normal positions.

2. An electric switch comprising a support, a plurality of contact elements carried by said support, a lever fulcrumed upon said support and capable of universal movement throughout its path of travel, devices projecting from said lever and adapted to engage said contact elements, a bridge-bar extended across said lever and normally out of contact therewith; said bar spaced from the fulcrumed portion of said lever, and means whereby the devices projecting from said lever remain in their respective positions when said lever is moved into engagement with said bridge-bar.

3. An electric switch comprising a support, a plurality of contact elements carried by said support, a lever fulcrumed upon said support and capable of universal movement throughout its path of travel, devices projecting from said lever and adapted to engage said contact elements, a bridge-bar extended across said lever and normally out of contact therewith; said bar spaced from the fulcrumed portion of said lever, means whereby the devices projecting from said lever remain in their respective positions when said lever is moved into engagement with said bridge-bar, and a second bridge-bar engageable with said lever at its fulcrum.

4. In an electric switch a suitable support, a lever pivoted thereon for universal movement, a circuit terminal upon said support at one side of the pivot of said lever, a second circuit terminal upon said support at the other side of the pivot of said lever, a contact element carried by said lever and brought into engagement with the first terminal by the movement of the lever in one direction, and means whereby said lever is adapted to be moved in another direction to engage said second terminal while said first terminal is engaged by said contact element.

5. In an electric switch a suitable support, a lever fulcrumed thereon, a plurality of terminals mounted on said support and having suitable contact elements on the face of said support within the path of travel of said lever, one of said contact elements bridging the opposite side of said lever, shoes carried by said lever and engageable with certain of said contact elements when said lever is moved in one direction, and means coacting with said lever and shoes whereby when the former is moved in a transverse direction said shoes remain in their positions relative to their respective contact elements and said lever is brought into engagement with the bridged contact.

6. An electric switch comprising an insulating plate, a lever suitably fulcrumed thereon for movement in planes at an angle to each other, spring-actuated shoes carried by said lever, circuit terminal plates on said support in the paths of said shoes, and a circuit terminal bridging said lever and out of engagement therewith, said lever movable in a plane parallel with said support to engage the shoes with their respective terminal plates whereby a movement of the lever transverse thereto brings the lever into engagement with the bridging terminal and retains the shoes in their positions relative to their respective terminal plates.

7. An electric switch comprising an insulating plate, a lever suitably fulcrumed thereon for movement in planes at an angle to each other, spring-actuated shoes carried by said lever, circuit terminal plates on said support in the paths of said shoes, a circuit terminal bridging said lever and out of engagement therewith, said lever movable in a plane parallel with said support to engage the shoes with their respective terminal plates and transversely thereto to engage said bridging terminal while said shoes engage their terminal plates, a bridge bar extending across said lever adjacent its fulcrum, a yielding carrier for said bar, and devices engaging said carrier the movement whereof moves said bridge-bar into and out of contact with said lever.

8. An electric switch comprising an insulating plate, a lever suitably fulcrumed adjacent one end for movement in planes at an angle to each other, a retractable shoe carried by said lever, a plate engaged by said shoe and connected with a suitable source of electric energy, a retractable shoe adjacent said first-mentioned shoe, a plurality of spaced tubular elements extended through said support in the path of travel of said second shoe, a retractable shoe on the lever on the opposite side of its fulcrum, a contact plate engageable with said last shoe, a movable bar bridging the lever in the plane of its fulcrum, means for moving said bar into and out of contact with said lever, a stationary bar bridging said lever adjacent said tubular elements, and said lever movable in a plane parallel to said insulating plate to operate the retractable shoes with their respective devices and movable therewith.

9. An electric switch comprising a pivoted arm, arcuate contact elements mounted at varying distances from but concentrically with respect to the axis of the movement of said arm whereby selective contact may be made between said arm and a plurality of said respective contact elements, and another contact element adapted to be adjusted out of and in yielding contact with said arm at the point of its axis of oscillation.

10. An electric switch comprising an arm mounted to oscillate in a plurality of planes, contact plates disposed parallel with and adjacent one plane of oscillation of said arm, yielding means for establishing contact between said arm and certain of said plates and for permitting the establishments of contact between said arm and other of said plates by the deflection of said arm from its normal plane of oscillation, another contact element, and means for adjusting the same out of contact with said arm and in yielding contact therewith adjacent its axis of oscillation.

Signed at Chicago, county of Cook and State of Illinois, this 30th day of August, 1920.

EDWARD G. BURESCH.

Witnesses:
BENJ. T. ROODHOUSE,
FLORENCE MITCHELL.